US005238375A

United States Patent [19]
Hirai

[11] Patent Number: 5,238,375

[45] Date of Patent: Aug. 24, 1993

[54] PRESSURE MOLDING MACHINE FOR VARIOUS STEPPED ARTICLES

[76] Inventor: Keita Hirai, 3-19, 1-chome, Sakae-cho, Kawaguchi-shi, Saitama, Japan

[21] Appl. No.: 832,875

[22] Filed: Feb. 10, 1992

[30] Foreign Application Priority Data

Feb. 8, 1991 [JP] Japan .................................. 3-102225

[51] Int. Cl.[5] .......................... B29C 43/36; B28B 3/08

[52] U.S. Cl. ...................................... 425/77; 100/237; 425/352; 425/356; 425/412; 425/414; 425/468

[58] Field of Search .................. 100/232, 237; 425/77, 425/78, 352, 354, 355, 356, 406, 412, 414, 468, 422, 441, 443

[56] References Cited

U.S. PATENT DOCUMENTS

| | | | |
|---|---|---|---|
| 2,509,783 | 5/1950 | Richardson | 425/78 |
| 2,562,876 | 8/1951 | Baeza | 425/354 |
| 4,153,399 | 5/1979 | DeSantis | 425/414 |
| 5,049,054 | 9/1991 | Schaidl et al. | 425/356 |

FOREIGN PATENT DOCUMENTS

| | | | |
|---|---|---|---|
| 60-15099 | 1/1985 | Japan | 425/352 |

*Primary Examiner*—Scott Bushey
*Attorney, Agent, or Firm*—William A. Drucker

[57] ABSTRACT

A pressure molding machine for molding various types of stepped articles having, a nest of ram adapters receiving thereon pressure rams and a common base support having cylindrical walls positioned coaxially. The end faces of the walls are at the same level for receiving thereon base ends of the ram adapters, and a nest of movable frames each operated by a pressure cylinder. The movable frames move along guide channels provided in the cylindrical walls of the common base support for operating the ram adapters. Total length and total weight of the machine can be minimized, a die-set is easy for manufacturing, mounting and exchanging, and costs for the equipment can also be minimized.

1 Claim, 5 Drawing Sheets

PRESSURE MOLDING MACHINE FOR VARIOUS STEPPED ARTICLES

TECHNICAL FIELD

This invention relates to molding machines operated under pressure for the production of various kinds of articles having steps and recessed portions such as gears, pulleys and the like.

TECHNICAL BACKGROUND

It is required to mold various kinds of stepped articles so as to prepare materials for sintering processes for the production of gears, pulleys or other machine parts. And, heretofore, molding machines having a principal portion such as shown in FIG. 8 have exclusively been used for the production of such various stepped articles.

In FIG. 8, pressure rams T1, T2, and T3 are positioned coaxially to core rod CR. Each one of said pressure rams is provided frictionally movably at least against an adjacent pressure ram or said core rod. And, power which has previously been charged in fixed mortar U is compressed by means of pressure rams T1, T2, and T3 and upper pressure rams which are not shown but are operated downwardly against pressure rams T1, T2, and T3, so that a stepped article can be molded. However, because such a molding machine is widely known and for the simplicity of drawings, said upper pressure ram and operating mechanism of the machine are omitted. Also, fluid pressure cylinders which are provided for the operation of pressure rams T1, T2, T3 are not shown.

And, as shown in FIG. 8, a mortar indicated at U is fixed to a mortar support TU which is fixed to a set of guide poles each indicated at G. Ram supports TS1, TS2, and TS3 which correspond to pressure rams T1, T2, and T3 respectively are positioned at a vertical distance apart from mortar support TU, ram supports TS1 and TS3 and core rod support CRS respectively. And, each one of said ram support or core rod support CRS is operated by a corresponding independent fluid pressure cylinder.

Further, in such a molding machine as shown, an upper pressure ram or upper pressure rams, not shown, is provided naturally so that powder charged in mortar U can be compressed for molding. In an exclusive machine for molding stepped articles of a fixed form having only a set of lower and upper pressure rams, vertical length of the machine can be out of consideration. But, in a machine for general use directed to the production of stepped articles having upper and lower principal faces of various shapes, a plural number of upper pressure rams and corresponding support structures are necessary to be provided. For this reason, a molding press heretofore known for the production of various stepped articles has a structure in which upper half portion of the machine has a structure having a feature substantially upside-down of that shown in FIG. 8.

Now, in a molding machine for general use, an amount of load to be impressed on each ram is different usually from one another according to shapes of the principal faces of articles to be molded. Accordingly, in a design of a molding machine, allowable amount of load for each ram support must be set at its possible maximum value that may be used in said molding machine.

On the other hand, because each one of said pressure rams or core rod CR, relates separately to actions for charging powder into the mortar, for temporary and real compression of powder, and for discharging molded articles. Accordingly, value of stroke length required for each pressure ram must be set at a value of the depth of said mortar and some surplus.

Moreover, an appropriate amount of room is required between said mortar support and an adjacent ram support, between ram support adjacent to each other, and between a ram support and said core rod support so that base portions and fixing bolts of said pressure rams and said core rod do not strike against said mortar support or ram support which are positioned above.

And, as each ram support is designed to have a thickness which corresponds to the maximum load for the corresponding ram as mentioned in the foregoing, an accumulation of thickness of said ram supports are added. So, the total length and the weight of the machine becomes very large. For example, for a machine having a mortar with depth for charge of 150 mm, and maximum value of load for each ram of 400 t/cm$^2$, normally, the total length and the total weight including pressure rams of the machine mount up to 10 to 13 m, and 30 to 60 ton respectively. Accordingly, costs for equipment including a powerful fundamental construction and a workshop mount up to an enormous amount.

Further, as the pressure rams cannot be designed short, the work for exchanging die-sets or sets of pressure rams is complicated and troublesome, and an appropriate setting of die-sets cannot be effected by whom who is not a skilled person. In a molding business for the production of stepped articles, change in the object for molding occurs frequently. And, almost in every case, exchange of die-sets is required, and for the exchange of die-sets, principally a new design and manufacturing of a new die-set is required. In such cases, production cost for a precise die-set having large lengths is of course very large.

As a molding machine for general use for the production of stepped articles heretofore known has drawbacks as stated in the foregoing, this invention is directed to eliminate such drawbacks, and to provide a machine which is small in size and weight, and which is also small in costs for equipment, and to provide a machine which is convenient in operation, and accordingly has a high economic value.

Figure 8:
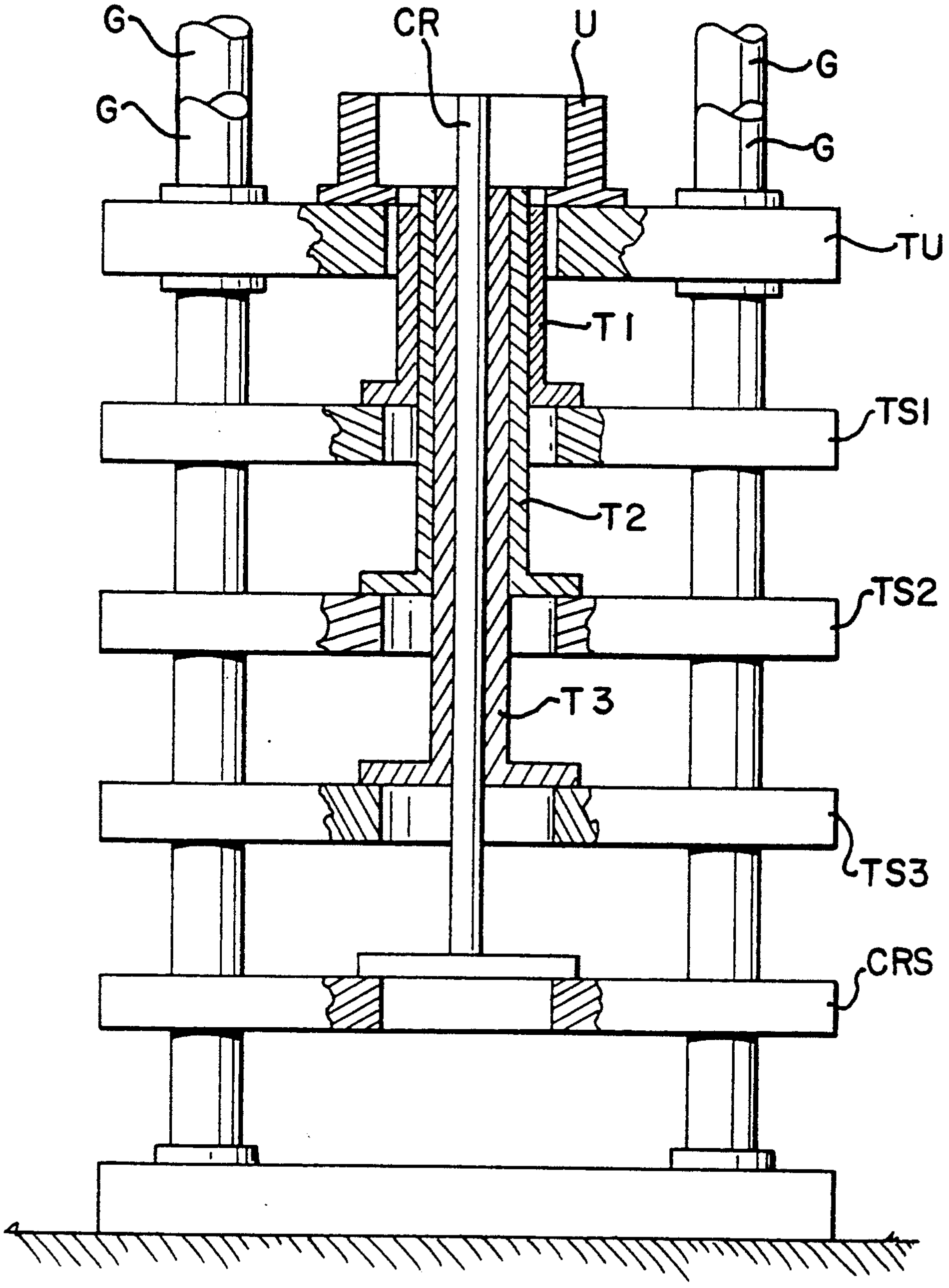
FIG. 8 PRIOR ART

And, FIG. 8 is a front elevational view partly in section of the lower half portion of a heretofore known molding machine for general use for producing stepped articles.

DESCRIPTION OF THE PREFERRED EMBODIMENTS

Figure 1:
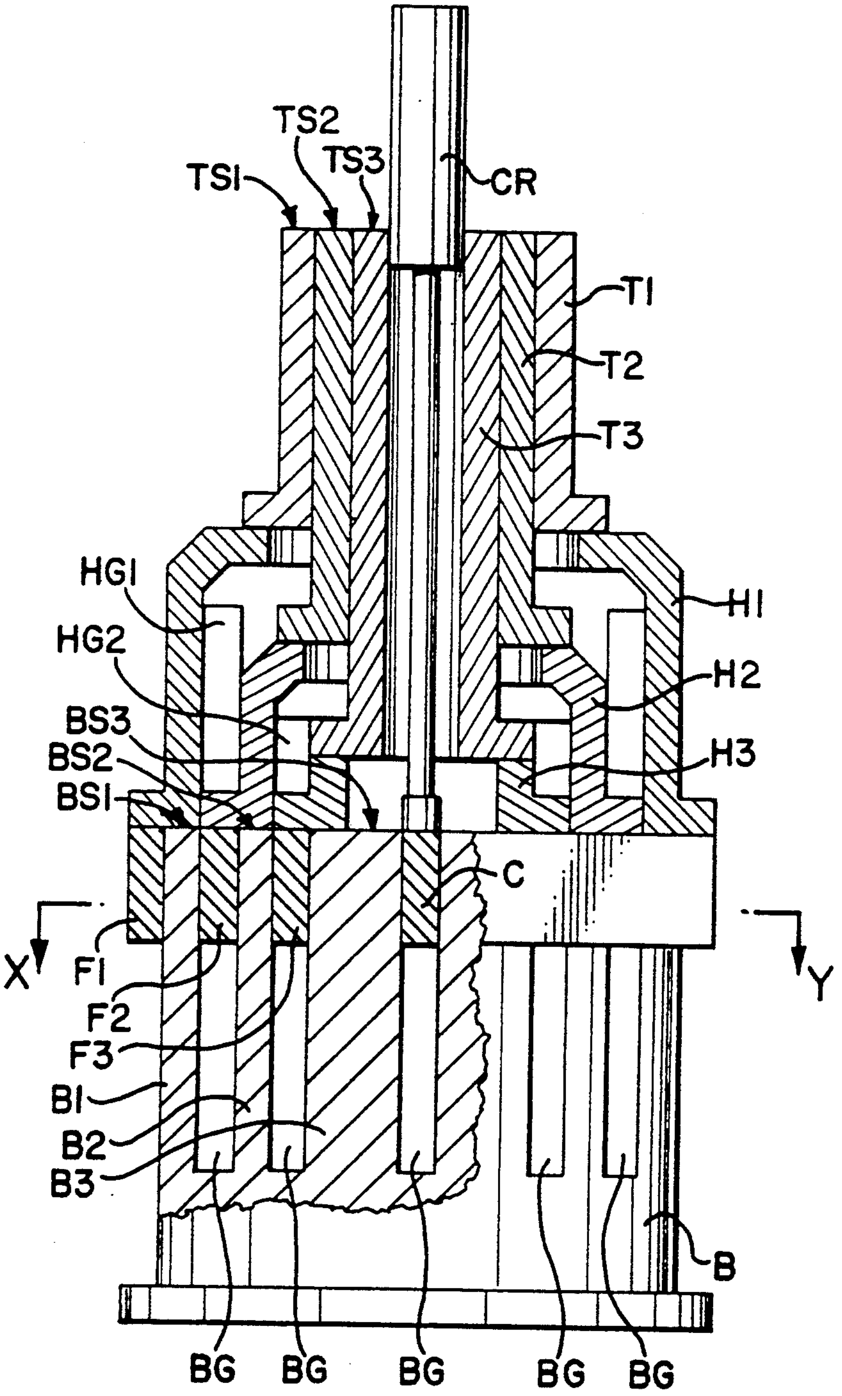
FIG. 1 is a front elevational view partly in section of principal structures excluding a mortar and its support means of an embodiment of this invention.
Figure 2:
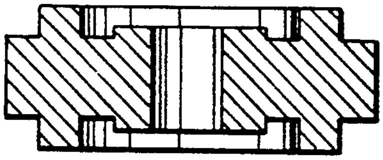
FIG. 2 is a vertical sectional view of an example of a stepped article.
Figure 3:
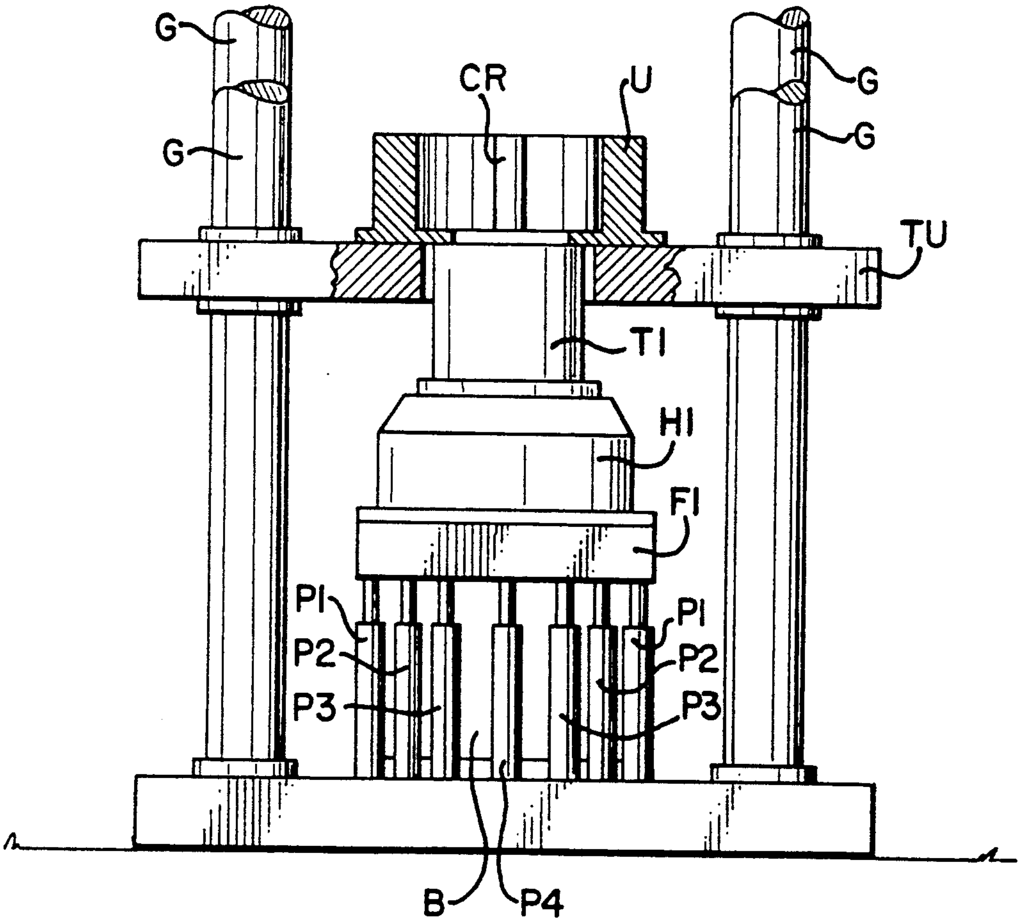
FIG. 3 is a front elevational view partly in section of the principal portion of an embodiment of this invention.
Figure 4:
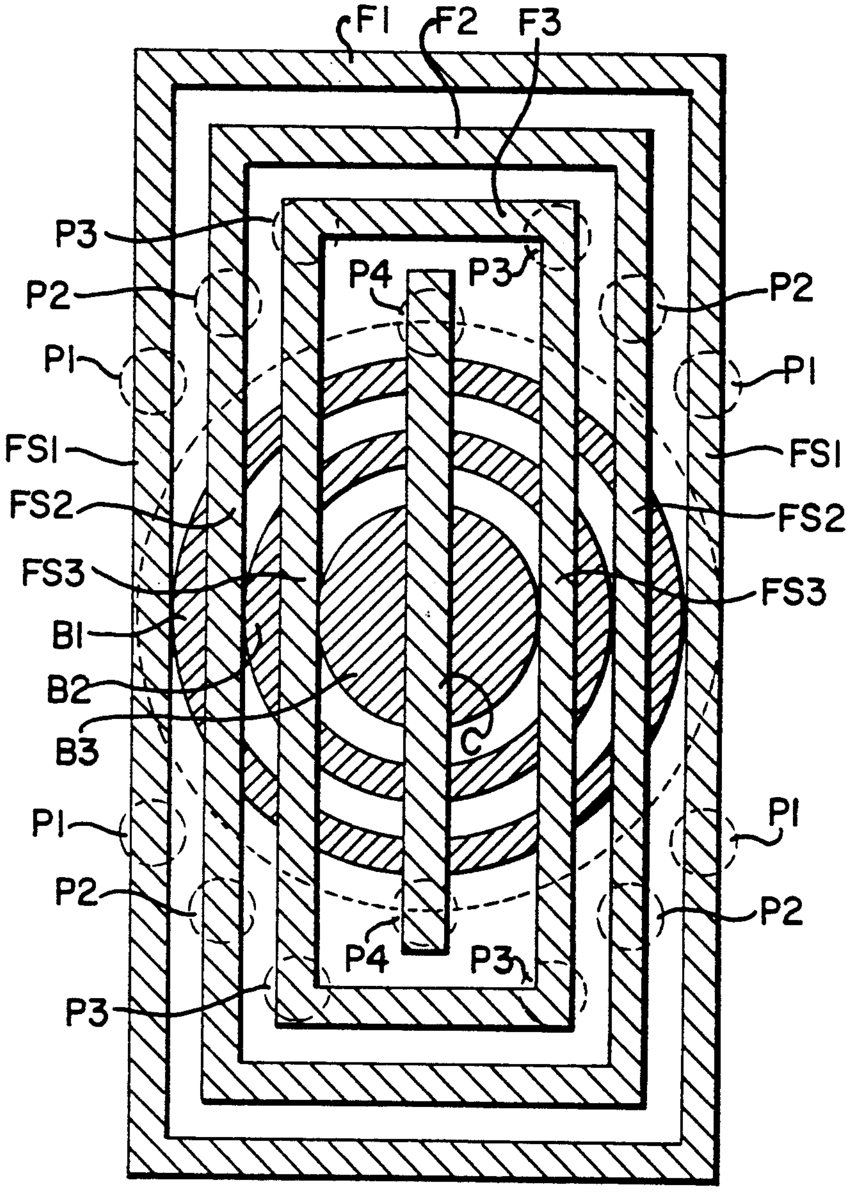
FIG. 4 is a X-Y lateral sectional view of FIG. 3.
Figure 5:
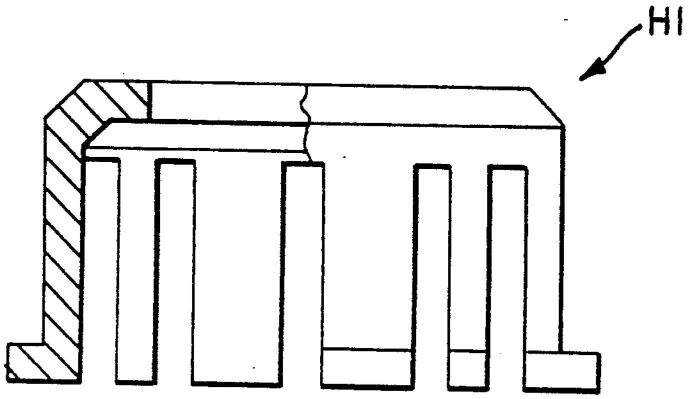
FIG. 5 is a front elevational view partly in section of ram adapter H1.
Figure 6:
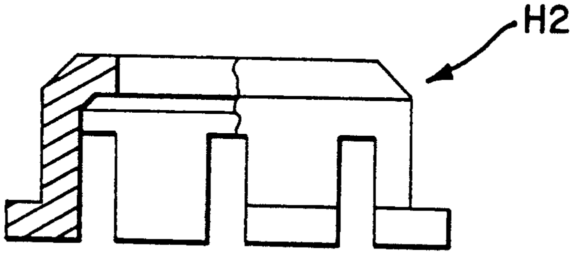
FIG. 6 is a front elevational view partly in section of ram adapter H2.
Figure 7:
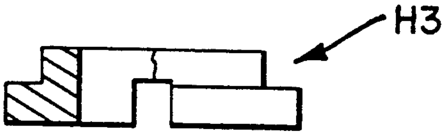
FIG. 7 is a front elevational view partly in section of ram adapter H3.

Hereunder will be stated this invention by reference to embodiments as shown in the drawings. A molding machine of this invention has a plural number of pressure rams. Referring to FIG. 1, the pressure rams are indicated at T1, T2, and T3. However, number of rams is not limited in this invention. Each pressure ram is cylindrical and positioned coaxially around core rod CR and is operated by fluid pressure cylinders P1, P2, and P3 respectively, which are shown in FIGS. 3 and 4. These pressure rams are provided frictionably movably against core rod CR and/or adjacently positioned other pressure rams. And, powder charged in fixed mortar U is compressed by these pressure rams so that stepped articles such as shown in FIG. 2 can be molded by said pressure rams. So, a molding machine of this invention is similar to that heretofore known and shown in FIG. 8 within a scope as stated above.

And, as shown in FIG. 3, mortar support TU is fixed to four guide poles G. Mortar U for molding stepped articles such as shown in FIG. 2 is bolted to mortar support TU.

According to this invention, H1, H2, and H3 are ram adapters which are nested. The base portions of pressure rams T1, T2, and T3 are fixed to corresponding ram adapters H1, H2, and H3 respectively. The base portions of pressure rams T1, T2, and T3 are bolted usually to corresponding ram adapters respectively, however, such fixing means are not shown in the drawing.

And, according to this invention, a common base support which has coaxial cylindrical walls B1, B2, and B3 is indicated at B. Annular end faces BS1, BS2, and BS3 of said cylindrical walls are positioned at a same level and receive thereon base ends of the corresponding ram adapters H1, H2, and H3 respectively.

Subsequently, according to this invention, F1, F2, and F3 are nested movable frames such as seen in FIG. 4. Each one of these movable frames receives a pressing force from fluid pressure cylinder P1, P2, and P3 respectively so that respective pair of frame sides FS1, FS2, and FS3 can be stroked against respective base ends of corresponding ram adapters H1, H2, and H3 respectively. And, among these frame sides, each one of frame sides FS2 and FS3 positioned inside of ram adapter H1 having largest diameter are inserted respectively through a corresponding guide channel BG which is provided through a cylindrical wall of common base support B.

And also, according to this invention, guide channels HG1 and HG2 are provided through the cylindrical walls of ram adapters H1 and H2 respectively. These guide channels HG1 and HG2 can pass frame sides FS2 of movable frame F2 and frame sides FS3 of movable frame F3 respectively.

Further, in an embodiment as shown, core rod CR is operated by fluid pressure cylinder P4 through the medium of movable plate C which passes through a guide channel BG provided at the center of common base support B. FIGS. 1, 3, and 4 are drawn at a state in which ram adapters H1, H2, and H3 are seated respectively on annular end faces BS1, BS2 and BS3 of cylindrical walls B1, B2, and B3 respectively of common base support B. Said annular end faces are positioned at a same level. FIGS. 1, 2, and 3 are drawn in which pressure rams T1, T2, and T3 form the bottom face of mortar U which is fixed to mortar support TU. On the other hand, movable frames F1, F2, and F3 respectively receive a pressing force from corresponding fluid pressure cylinders P1, P2, and P3, so that frame sides FS1, FS2, and FS3 (refer to FIG. 4) can strike against said base end faces of ram adapters H1, H2, and H3 respectively.

Further, it should be understood that in FIG. 3, only the principal portion of the structure lower than mortar U is shown, and as the whole structure of the molding press, a press structure which is substantially similar to that shown in FIG. 3 but having an upside-down feature is provided above mortar U.

Now, as this invention is composed as stated in the foregoing, top portion of core rod CR is inserted in mortar U, ram adapters H1, H2 and H3 are seated on end faces BS1, BS2, and BS3 of common base support B respectively, so that end faces TS1, TS2, and TS3 respectively of said pressure rams form the bottom face of mortar U. Then, desired kind of powder is charged in mortar U, and end faces of pressure rams of the upper structure as stated in the foregoing but not shown are engaged to the top face of said powder which has been charged.

It goes without saying that, each pressure ram and the height of the ram adapters which correspond to said pressure rams must previously be designed suitably, so that the bottom face of mortar U is formed by end faces respectively of annular end faces TS1, TS2, and TS3 (refer to FIG. 1) at a state in which base ends of the ram adapters are stated respectively on annular end faces BS1, BS2, and BS3 of common base B.

Subsequently, said movable frames are operated by the corresponding foregoing fluid pressure cylinders respectively so that the required foregoing pressure ram is or pressure rams are operated through the medium of the foregoing ram adapter or ram adapters for a temporary compression of the powder in the mortar, so that a layer of powder corresponding to a pressure ram may not be moved, by mutual interference, against other layers of powder corresponding to other said pressure rams.

Then, the real compression of powder is effected by means of operating said movable frame or frames required. It goes without saying that, in said real compression of powder the amount of load and the stroke of each pressure ram are different from one another according to the shape of the predetermined stepped article for the product. Frame sides FS2 and FS3 of corresponding movable frames are positioned inside ram adapters H1 and H2 respectively. However, because said frame sides FS2 and FS3 are positioned in guide channels HG1 and HG2 respectively, said frame sides are not prevented by said ram adapters upon vertical movement of said movable frames.

Thus, predetermined maximum values of load with respect to said pressure rams are attained in said real compression, said pressure loads are released, and said pressure rams are lowered so that said ram adapters are seated on annular end faces of foregoing common base support, and molding work is finished. Then, a molded article is discharged from the mortar by means of a stroke of a suitable pressure ram.

Now, as mentioned in the foregoing, in a molding press for general use for the production of stepped articles heretofore known and such as shown in FIG. 8, a large total length of a die-set and a large total weight of the press structure cannot be avoided. It is because, in such an old press machine, said pressure rams are supported by ram supports positioned at levels which are different from one another, and said total length of said die-set is composed not only by total amount of strokes of rams T1, T2, and T3 which corresponds to depth of charge of mortar U and an amount of stroke of core rod CR, but total amount of thickness of ram supports TS1, TS2, and TS3 which support respectively predetermined maximum load at levels respectively different to one another is added to said amount of strokes of said pressure rams.

However, according to this invention, because ram adapters H1, H2 and H3 are composed, as mentioned in the foregoing, in a feature of co-axial nest mounted on annular end faces BS1, BS2, and BS3 which are positioned at a same level, of a base support, and because, movable frames H1, H2 and H3 which correspond respectively to ram supports TS1, TS2, and TS3 of a press heretofore known and shown in FIG. 8 are composed in a feature of nest and at a same level, the total length of a die-set composed of pressure rams T1, T2, and T3 is extremely short. And, even if ram adapters H1, H2, and H3 are to be included in said die-set, said total length is remarkably short as compared with a die-set for a molding press for general use for the production of stepped articles, and the total height including common base support B is very small. For example, provided that the depth of charge in mortar U is 150 mm, and designed maximum value of load of each pressure ram is 400 ton/$cm^2$, the total height including the upper structure not shown, of the molding press is 3.5 m which is only $\frac{1}{3}$ of the total height of such a molding machine heretofore known. And, according to shortening of height, total weight of the machine is 15 ton which is only $\frac{1}{2}$ to $\frac{1}{4}$ of total weight of a molding machine heretofore known.

UTILITY IN INDUSTRY

According to this invention, because a molding machine for general use for the production of stepped articles having a total length and total weight much smaller than an old press can be provided, the machine can be housed within a low structure, and equipment costs for the construction of the machine base are very small. And, because each pressure ram is very short and small, costs for designing and manufacturing of die-sets are very small, and it is very convenient for the management and treatment of the die-sets. Moreover, according to this invention, because a die-set can be mounted on ram adapters which have been set at a same level, the mounting work is far more simpler than mounting works in an old machine, in which each pressure ram must be mounted on a ram support which has previously been fixed temporarily at a level different to one another, and accordingly exchanging work of die-sets can be simplified remarkably and a skilled labor is not required.

Thus, according to this invention, equipment and operation costs for the production of stepped molds are remarkably minimized.

I claim:

1. In a molding machine for various stepped articles having upper and lower press structures, wherein at least one of said structures comprises: a plural number of cylindrical pressure rams positioned coaxially to a core rod, said pressure rams being provided frictionally movable against said core rod or against another pressure ram or pressure rams respectively, said pressure rams compressing under pressure powder charged in a fixed mortar for molding stepped articles; a plurality of ram adapters, each said ram adapter receiving thereon a base end of a corresponding pressure ram among said plural number of rams; a common base support having an axis and a plurality of cylindrical walls, said cylindrical walls being coaxial to one another and said axis of said base support, said cylindrical walls each having an annular end face positioned at a fixed level for receiving thereon a corresponding ram adapter respectively, said cylindrical walls being provided therethrough with guide channels positioned in parallel to the axis of said common base support; and a plurality of movable frames, each of said movable frames being rectangular and having frame sides for receiving a pressing force of a corresponding fluid pressure cylinder so as to strike against a base end of a corresponding ram adapter, said frame sides positioned within said ram adapter passing through said guide channel of said common base support; each of said cylindrical walls of said ram adapters except the most inner one having guide channels for passing therethrough a frame side of said movable frame which corresponds to said ram adapter which is positioned adjacent thereto and positioned therewithin.

* * * * *